Sept. 13, 1949.           C. D. OVERLY            2,481,777
                            FASTENER
                        Filed Aug. 5, 1946
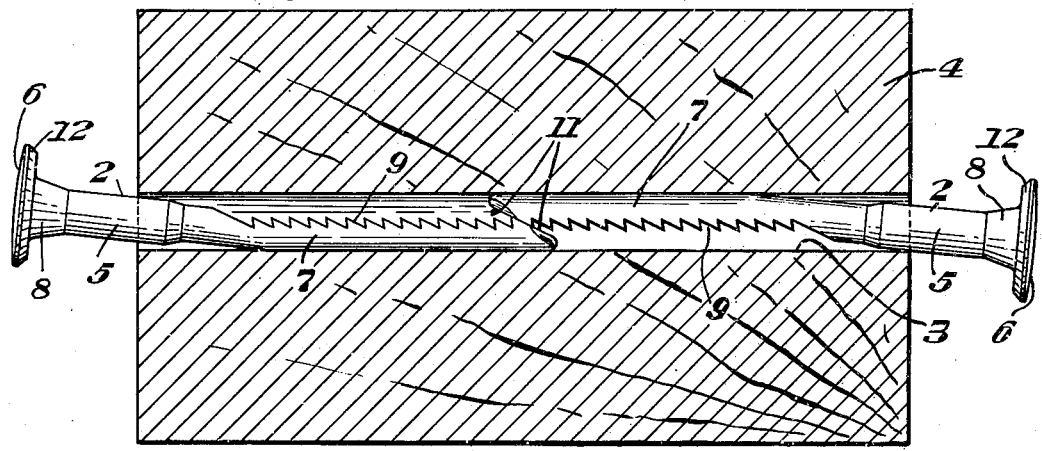
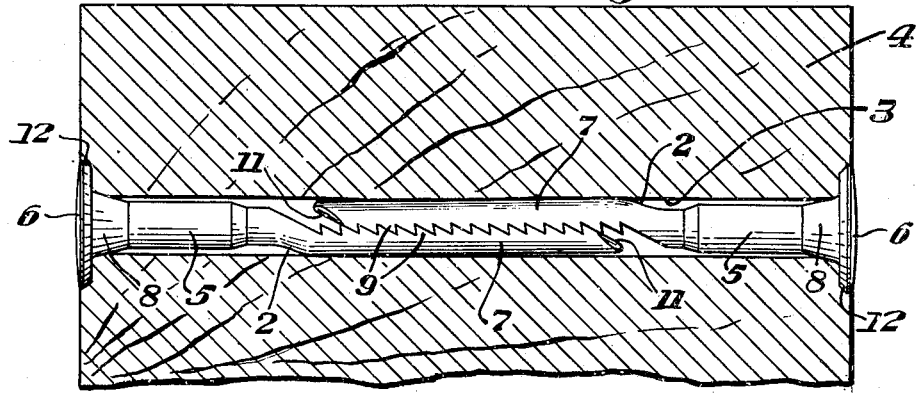
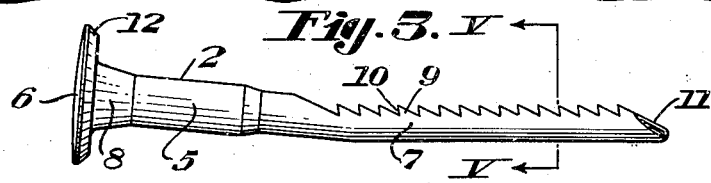
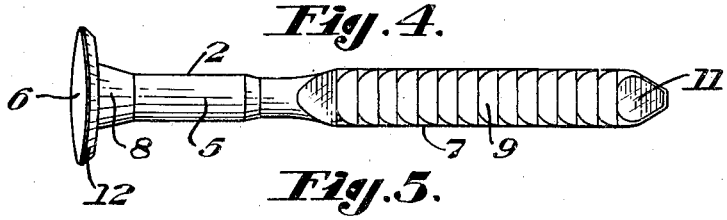
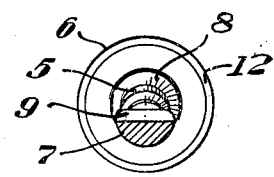
INVENTOR
Charles D. Overly Patented Sept. 13, 1949

2,481,777

UNITED STATES PATENT OFFICE 2,481,777

FASTENER

Charles D. Overly, Pittsburgh, Pa., assignor to Oliver Iron and Steel Corporation, Pittsburgh, Pa., a corporation of Pennsylvania Application August 5, 1946, Serial No. 688,529

4 Claims. (Cl. 85—4)

The present invention relates to a fastening device for holding together two or more members, or for preventing a member from splitting into several parts, or for securing together parts of one or more members which have already started to crack or split.

Generally speaking, the fastener which I provide comprises two separate parts, which are hereinafter referred to as grips, adapted to be inserted from opposite ends of a previously prepared hole in the member or members and to lie in partially overlapped relationship in the hole. As the grips are placed in the hole, they slide a variable distance past each other until the enlarged end or head on the outer end of each grip thrusts against the outside of the member to which it is being applied. Each grip has serrated teeth formed approximately transversely to the axis of the grip and along one side, and when the ends of the grips are overlapped in the hole, the teeth on the grips engage each other and prevent subsequent separation of the grips. In fastening two or more timbers which are somewhat separated, or in closing existing cracks in timbers, the thrust required to close the crack can also be used to force the opposing grips into overlapping relationship. When the pressure is released the engaged teeth of the two grips prevent the cracks or separations from opening. The grips can be made of any material, but are preferably made of steel, iron, or a non-ferrous metal. It is merely necessary that the grips be made of a material having sufficient tensile strength to withstand the forces tending to pull them apart.

It is not necessary that the two grips comprising a pair be of the same length. The shank portions of the grips can be varied in length so that two lengths of grips can be used to fasten objects of many thicknesses. A further variation in thickness of the objects secured is permitted by reason of the fact that the grips may overlap over the entire toothed portion or over only a part of the toothed portion. As will be apparent from the specific description set forth hereinafter, the grip which I provide is designed so that when only a few teeth are engaged, the full strength of the fastener is developed.

In the accompanying drawing, I have shown for purposes of illustration only, a preferred embodiment of my invention. In the drawing Figure 1 is a section through a timber with the grips inserted in the hole through the timber, but not in gripping position;

Figure 2 is a view similar to Figure 1, with the grips driven into fastening, overlapping position;

Figure 3 is a side view of one of the grips embodying my invention;

Figure 4 is a top view of the grip illustrated in Figure 3; and

Figure 5 is a section taken along the line V—V of Figure 3, looking in the direction of the arrows.

As shown in the drawing, the fastener which I provide comprises a pair of grips 2 adapted to be inserted from opposite ends into a hole 3 extending through the timber 4 to be reinforced. Each grip has a shank portion 5, an enlarged head 6, a toothed section 7 and a tapered neck portion 8 extending between the shank portion and the enlarged head 6. The toothed section 7 has a plurality of teeth 9 thereon, and these teeth are provided with a backward slant, the engaging faces 10 of the teeth being inclined upwardly toward the headed end of the grip. This back-rake of the teeth causes any longitudinal separating force to make the teeth engage more tenaciously. The toothed portion of the grip is provided with a flat, tapered end 11, so that when the two grips are forced toward each other in the hole, the teeth thereon will become properly aligned. The normal diameter of the toothed section is preferably less than the diameter of the shank portion. By normal diameter is meant the diameter of the toothed section before it is flattened in the formation of the teeth. It is also the diameter of the toothed section where it joins the shank portion of the grip. The normal diameter of each toothed section is such that when the two flattened toothed portions lie in overlapping relationship, the combined diameter of the over-lapping toothed sections is greater than the shank diameter of each grip.

The relationship between the diameter of the shank portion and the normal diameter of the toothed section mentioned above is not necessary to a proper functioning of the fastener. If a relatively small head is required on each of the grips, the size of the stock from which the grips are formed may be of such diameter as to make it undesirable or unnecessary to make the toothed section of a diameter smaller than the shank diameter. At the same time, the stock may be of sufficient diameter to provide the necessary material for the upsetting of the head.

The enlarged head 6 has a diameter which is greater than the diameter of the shank. As is illustrated in Figure 2, the enlarged head abuts the adjacent face of the timber when the grips are forced into overlapping relationship. The inner face of the head of the grip is provided with a bevel 12 which may be forced into the timber, to some extent, so as to provide a seal for the hole in which the grip is positioned. This seal prevents water from getting into the hole through the end thereof and, hence, reduces the corrosion action on the fastener.

Between the enlarged head and the shank portion, each grip has a tapered neck portion 8. The mean diameter of this neck portion is greater than the diameter of the shank portion, but less than the diameter of the head. The diameter of this neck portion increases from the shank toward the head. The diameter of the neck portion closest the head should be as great as, or slightly greater than, the hole into which the grip is to be placed. By providing a very close fit between a part of the neck portion and the hole, a further sealing action can be obtained. In addition, this tapered neck portion performs the important function mentioned below.

As will be noted in Figures 1 and 3, the longitudinal axis of the toothed section of the grip extends angularly in relation to the longitudinal axis of the shank. This bend in the grip is preferably formed near the end of the toothed portion closest the shank portion. This angular relationship provides a more positive interlocking of the teeth than could be obtained otherwise, as it provides a side thrust which is effective between the toothed portions when the grips are driven into position in the hole. This side thrust is produced by the tapered neck portion under the head in combination with the angular position of the toothed portion in relation to the axis of the shank. When the ends of the toothed portions meet in the hole in the timber, they force each other to parallel the hole, as is illustrated in Figure 1. When in this position, the shank portions are not parallel with the hole and they do not become parallel with the hole until the two grips are driven into the position illustrated in Figure 2. When the tapered neck portion enters the hole, the shank portion is forced to be practically concentric with the hole and this forces the toothed portions to mesh tightly in the bending action which tends to straighten out the angle between the toothed portion and the shank portion of each grip. This bending action is obtained between the heel of the toothed portion which contacts one side of the hole and that portion of the tapered neck which bears on the opposite side of the hole.

As is stated above, the grips may be formed of any material having the necessary tensile strength but are preferably made of steel. In the manufacture of the grip, a blank of substantially the final shank diameter is used. The blank is first headed and, at the same time, the tapered or neck portion is formed. The end to be toothed is then extruded so as to reduce the diameter and increase the length thereof. The end of the extruded portion is then pointed or beveled. The extruded portion is then placed between dies and the teeth formed. At the same time that the teeth are formed, the diameter of the toothed section in the direction of the faces of the teeth is increased so that when the two toothed sections are put together, the total diameter thereof will be greater than that of the shank and will fit closely the circumference of the hole. At the same time that the teeth are formed, the grip is bent to provide the angular relationship between the longitudinal axis of the toothed section and the longitudinal axis of the shank. For economy of manufacture it is important that the extruded diameter be small enough to permit forming the teeth by squeezing without removal of any material; that the shank be somewhat larger than the extruded portion but only sufficient to permit upsetting the head and neck; and that the tapered neck be included to align the shank with the hole when the head is driven home.

Thus it will be seen that the fastener which I provide can be manufacturer simply and cheaply, and that it will securely and permanently hold together two or more parts or reinforce a member so that it will not split. It will also be seen that the fastener which I provide can be readily applied without the use of special tools.

While I have shown and described a preferred embodiment of my invention, it will be understood that it can be otherwise embodied within the scope of the appended claims.

I claim:

1. A fastening device comprising a pair of grips adapted to be inserted from opposite ends into a hole extending through the members to be secured or reinforced, and to lie in partially overlapped relationship in the hole, each of said grips having a shank portion, an enlarged head at one end of the shank portion, said head having a diameter greater than the diameter of the shank portion, and a flattened toothed section at the other end of the shank portion, said section having a plurality of teeth thereon, the longitudinal axis of the toothed section extending angularly in relation to the axis of the shank in the direction in which the teeth face.

2. A fastening device comprising a pair of grips adapted to be inserted from opposite ends into a hole extending through the members to be secured or reinforced and to lie in partially overlapped relationship in the hole, each of said grips having a shank portion, an enlarged head at one end of the shank portion, said head having a diameter greater than the diameter of the shank portion, a flattened toothed section at the other end of the shank portion, said toothed section having a plurality of teeth thereon, and a tapered neck portion extending between the enlarged head and the shank portion, the mean diameter of the neck portion being greater than the diameter of the shank portion, the neck portion increasing in diameter from the shank toward the head, the longitudinal axis of the toothed section extending angularly in relation to the axis of the shank in the direction in which the teeth face.

3. A fastening device comprising a pair of grips adapted to be inserted from opposite ends into a hole extending through the members to be secured or reinforced, and to lie in partially overlapped relationship in the hole, each of said grips having a shank portion, an enlarged head at one end of the shank portion, said head having a diameter greater than the diameter of the shank portion, and a toothed section at the other end of the shank portion, said section having thereon a plurality of teeth extending angularly upwardly toward the enlarged head to provide a back rake of the teeth, the longitudinal axis of the toothed section extending angularly in relation to the axis of the shank in the direction in which the teeth face.

4. A fastening device comprising a pair of grips adapted to be inserted from opposite ends into a hole extending through the members to be secured or reinforced and to lie in partially overlapped relationship in the hole, each of said grips having a shank portion, an enlarged head at one end of the shank portion, a toothed section at the other end of the shank portion, said toothed section having thereon a plurality of teeth, the faces of which extend angularly upwardly toward the enlarged head, and a tapered neck portion extending between the enlarged head and the shank portion, the mean diameter of the neck portion being greater than the diameter of the shank portion, the neck portion increasing in diameter from the shank toward the head, the longitudinal axis of the toothed section extending angularly in relation to the axis of the shank in the direction in which the teeth face.

CHARLES D. OVERLY.

REFERENCES CITED

The following references are of record in the file of this patent:

UNITED STATES PATENTS

| Number | Name | Date |
|---|---|---|
| Re. 20,485 | MacLean | Aug. 24, 1937 |
| 282,077 | Hardin | July 31, 1883 |
| 1,337,807 | Wightman | Apr. 20, 1920 |
| 2,201,551 | Welk | May 21, 1940 |